(12) United States Patent
Lincoln et al.

(10) Patent No.: US 10,528,331 B2
(45) Date of Patent: Jan. 7, 2020

(54) OPTIMIZING A CACHE OF COMPILED EXPRESSIONS BY REMOVING VARIABILITY

(71) Applicant: International Business Machines Corporation, Armonk, NY (US)

(72) Inventors: Nicholas K. Lincoln, Winchester (GB); Simon D. Stone, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 15/492,250

(22) Filed: Apr. 20, 2017

(65) Prior Publication Data

US 2018/0307469 A1 Oct. 25, 2018

(51) Int. Cl.
*G06F 17/30* (2006.01)
*G06F 7/00* (2006.01)
(Continued)

(52) U.S. Cl.
CPC .......... *G06F 8/443* (2013.01); *G06F 16/8358* (2019.01); *G06F 16/8365* (2019.01); *G06F 16/8373* (2019.01)

(58) Field of Classification Search
CPC . G06F 8/30; G06F 8/423; G06F 8/427; G06F 8/443; G06F 8/445; G06F 8/447;
(Continued)

(56) References Cited

U.S. PATENT DOCUMENTS 7,512,592 B2  3/2009 Lemoine
7,913,241 B2 * 3/2011 Liu ................... G06F 17/30935
                                                      717/151
(Continued)

FOREIGN PATENT DOCUMENTS

KR    1020080090647 A    10/2008

OTHER PUBLICATIONS

Ogden et al., Scalable XML query processing using parallel push-down transducers, 12 pages (Year: 2013).*
(Continued)

*Primary Examiner* — Thuy Dao
(74) *Attorney, Agent, or Firm* — William H. Hartwell; Madeline F. Schiesser; Keohane & D'Alessandro PLLC

(57) ABSTRACT

Approaches presented herein enable optimization of a cache of compiled XML Path Language (XPath) expressions by removing variability from XPath expressions. More specifically, XPath expressions are identified that are the same but for one or more hardcoded values. These hardcoded values are identified and replaced in an identified XPath expression with an identifier to form a cache optimized XPath expression that lacks the hardcoded value variability of the identified XPath expressions. This cache optimized XPath expression is inserted into a cache optimized function that receives the hardcoded value as arguments and assigns the received hardcoded value to the identifier in the cache optimized XPath expression. The identified XPath expressions are then rewritten as calls to the cache optimized function or to another function wrapping the cache optimized function. Therefore, only the cache optimized XPath expression, instead of several of the identified XPath expressions, is stored in the XPath expression cache.

21 Claims, 5 Drawing Sheets

(51) Int. Cl.
*G06F 17/00* (2019.01)
*G06F 17/22* (2006.01)
*G06F 15/16* (2006.01)
*G06F 9/44* (2018.01)
*G06F 8/41* (2018.01)
*G06F 16/835* (2019.01)

(58) Field of Classification Search
CPC ............ G06F 16/8358; G06F 16/8365; G06F 16/8373; G06F 16/86; G06F 16/83; G06F 17/2247; G06F 8/65; G06F 9/455; G06F 9/45504; Y10S 707/99933; Y10S 707/99942; H04L 67/2842; H04L 63/0807; H04L 67/02; H04L 67/28
See application file for complete search history.

(56) References Cited

U.S. PATENT DOCUMENTS

| | | | |
|---|---|---|---|
| 8,073,841 B2 | 12/2011 | Tarachandani et al. | |
| 8,074,166 B2 | 12/2011 | Lapounov et al. | |
| 8,745,031 B2 | 6/2014 | Sthanikam et al. | |
| 8,799,305 B2* | 8/2014 | Young, Jr. | H04L 67/2823 |
| | | | 707/758 |
| 8,938,440 B2* | 1/2015 | Denoual | G06F 17/30023 |
| | | | 707/706 |
| 9,430,582 B2* | 8/2016 | Cai | G06F 16/8373 |
| 9,529,934 B2* | 12/2016 | Li | G06F 16/8365 |
| 9,996,441 B2* | 6/2018 | Patzer | G06F 17/2258 |
| 10,097,551 B2* | 10/2018 | Chan | H04L 63/083 |
| 2007/0022105 A1 | 1/2007 | Roux | |
| 2007/0208769 A1 | 9/2007 | Boehm et al. | |
| 2007/0288429 A1* | 12/2007 | Liu | G06F 17/30935 |
| 2008/0178092 A1* | 7/2008 | Schmidt | G06F 8/33 |
| | | | 715/736 |
| 2009/0210782 A1* | 8/2009 | Denoual | G06F 17/218 |
| | | | 715/234 |
| 2010/0306273 A1* | 12/2010 | Branigan | G06F 17/30911 |
| | | | 707/802 |
| 2011/0307581 A1* | 12/2011 | Furbeck | H04L 65/1083 |
| | | | 709/219 |
| 2012/0109913 A1 | 5/2012 | Rajure et al. | |
| 2013/0226942 A1* | 8/2013 | Denoual | G06F 17/3005 |
| | | | 707/754 |
| 2014/0067871 A1 | 3/2014 | Meek et al. | |
| 2014/0156360 A1 | 6/2014 | Shalita et al. | |
| 2014/0304305 A1* | 10/2014 | Hui et al. | G06F 17/30294 |
| | | | 707/803 |

OTHER PUBLICATIONS

Unknown, "Configuring the XPath Cache", Version 10.0.0.7, IBM Knowledge Center, Nov. 28, 2016, 2 pgs.
Unknown, "Compiled XPath Expressions", https://msdn.microsoft.com/en-us/library/093b7219, Sep. 8, 2012, 4 pgs.
Li, Guo-Liang et al., "An Effective Semantic Cache for Exploiting XPath Query/View Answerability", Mar. 16, 2010, 5 pgs.

* cited by examiner

OPTIMIZING A CACHE OF COMPILED EXPRESSIONS BY REMOVING VARIABILITY

TECHNICAL FIELD

The present invention relates generally to preventing cache memory misses and, more specifically, to optimizing a cache of compiled expressions by removing variability among cached XPath expressions.

BACKGROUND

Extensible Markup Language (XML) is a markup language used to annotate data in a document, a page, or a file. XML permits data to be self-describing through the structure of the data itself. For example, in XML, an element is defined by tags and can be nested within other elements. These tags can include attributes that describe characteristics of elements. Moreover, XML supports a structured hierarchy that indicates relationships between different elements. This allows data in an XML format to be readily shared, because a recipient of XML formatted data can automatically perceive the structure and relationships between elements of the data.

XML is the basis for many document formats used today to share information, such as Atom Syndication Format (Atom), Extensible Hypertext Markup Language (XHTML), Rich Site Summary (RSS), Scalable Vector Graphics (SVG), and Simple Object Access Protocol (SOAP). This has permitted XML to become largely ubiquitous in a diverse number of fields, including web publishing and searching, e-business and office-productivity tools, communication protocols, metadata applications, and pervasive computing.

Within XML, XML Path Language (XPath) is used to identify elements or nodes within an XML-formatted document, page, or file. Syntax of XPath describes how to navigate a path to a node or node-set within an XML document. From the perspective of an expression written using XPath syntax, an XML document is like a tree with branches, each representing nodes. Therefore, an XPath expression can be used to locate, and subsequently process, items in documents having an XML format and structure, thereby facilitating the use of XML in many fields of modern computing.

SUMMARY

In general, embodiments described herein provide for enable optimization of a cache of compiled XML Path Language (XPath) expressions by removing variability from XPath expressions. More specifically, XPath expressions are identified that are the same but for one or more hardcoded values. These hardcoded values are identified and replaced in an identified XPath expression with an identifier to form a cache optimized XPath expression that lacks the hardcoded value variability of the identified XPath expressions. This cache optimized XPath expression is inserted into a cache optimized function that receives the hardcoded value as arguments and assigns the received hardcoded value to the identifier in the cache optimized XPath expression. The identified XPath expressions are then rewritten as calls to the cache optimized function or to another function wrapping the cache optimized function. Therefore, only the cache optimized XPath expression, instead of several of the identified XPath expressions, is stored in the XPath expression cache.

One aspect of the present invention includes a method for optimizing a cache of compiled XML Path Language (XPath) expressions, the method comprising: identifying a plurality of XPath expressions, wherein at least a portion of each XPath expression is the same among the plurality and at least one hardcoded value differs between a first XPath expression of the plurality and a second XPath expression of the plurality; generating a cache optimized XPath expression from the first XPath expression by replacing the differing at least one hardcoded value with a variable identifier; and inserting the cache optimized XPath expression into a cache optimized XPath function configured to receive a hardcoded value as an argument of the function and to assign the received hardcoded value to the variable identifier in the cache optimized XPath expression.

Another aspect of the present invention includes a computer system for optimizing a cache of compiled XML Path Language (XPath) expressions, the computer system comprising: a memory medium comprising program instructions; a bus coupled to the memory medium; and a processor, for executing the program instructions, coupled to a compiled XPath expression optimizer tool via the bus that when executing the program instructions causes the system to: identify a plurality of XPath expressions, wherein at least a portion of each XPath expression is the same among the plurality and at least one hardcoded value differs between a first XPath expression of the plurality and a second XPath expression of the plurality; generate a cache optimized XPath expression from the first XPath expression by replacing the differing at least one hardcoded value with a variable identifier; and insert the cache optimized XPath expression into a cache optimized XPath function configured to receive a hardcoded value as an argument of the function and to assign the received hardcoded value to the variable identifier in the cache optimized XPath expression.

Yet another aspect of the present invention includes a computer program product for optimizing a cache of compiled XML Path Language (XPath) expressions, the computer program product comprising a computer readable storage device, and program instructions stored on the computer readable storage device, to: identify a plurality of XPath expressions, wherein at least a portion of each XPath expression is the same among the plurality and at least one hardcoded value differs between a first XPath expression of the plurality and a second XPath expression of the plurality; generate a cache optimized XPath expression from the first XPath expression by replacing the differing at least one hardcoded value with a variable identifier; and insert the cache optimized XPath expression into a cache optimized XPath function configured to receive a hardcoded value as an argument of the function and to assign the received hardcoded value to the variable identifier in the cache optimized XPath expression.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
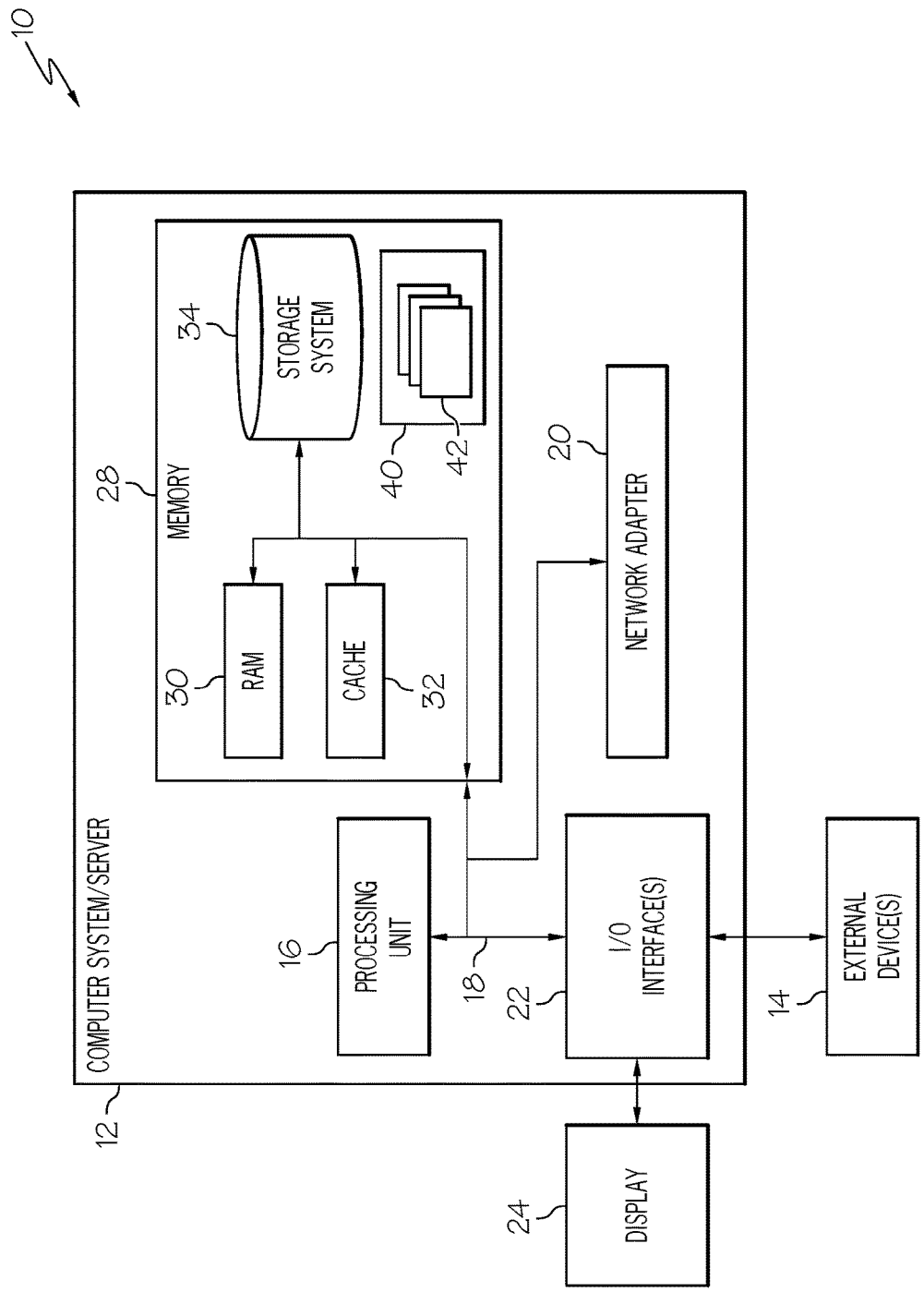
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for optimization of a cache of compiled XML Path Language (XPath) expressions by removing variability from XPath expressions. More specifically, XPath expressions are identified that are the same but for one or more hardcoded values. These hardcoded values are identified and replaced in an identified XPath expression with an identifier to form a cache optimized XPath expression that lacks the hardcoded value variability of the identified XPath expressions. This cache optimized XPath expression is inserted into a cache optimized function that receives the hardcoded value as arguments and assigns the received hardcoded value to the identifier in the cache optimized XPath expression. The identified XPath expressions are then rewritten as calls to the cache optimized function or to another function wrapping the cache optimized function. Therefore, only the cache optimized XPath expression, instead of several of the identified XPath expressions, is stored in the XPath expression cache.

Referring now to FIG. 1, a computerized implementation 10 of an embodiment for optimizing a cache of compiled XPath expressions by removing variability from XPath expressions will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for optimizing a cache of compiled XPath expressions by removing variability from XPath expressions. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing a cache of compiled XPath expressions by removing variability from XPath expressions, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Moving on, Extensible Markup Language (XML) is used in many fields of computing, including web publishing, web searching, data sharing, e-business and office-productivity tools, communication protocols, metadata encoding, and pervasive computing. When data is shared in an XML-formatted document, an XPath expression can be used to locate and process the data within the document. The syntax of the XPath expression includes a list of navigation instructions leading to the particular data within the XML document.

Sometimes when processing data in an XML-formatted document, the same sets of data and/or closely related data (e.g., having one or more root elements in common) will need to be retrieved several times. Each set of data or process performed on the data requires a different XPath expression to retrieve or process that particular data. Further, these XPath expressions must be parsed and compiled to allow a computer to perform the task described in the XPath expression.

Because parsing and compiling XPath expressions is a relatively expensive operation in terms of processing time, it is commonplace to store a mapping of XPath expressions to their compiled form in an XPath expression cache. If a stored XPath expression is called several times, then the compiled form of that expression can be quickly retrieved by performing a relatively swift string matching operation instead of having to reparse and recompile the XPath expression each time it is called.

Within the XPath expression cache a compiled XPath expression may be stored as an optimized form that is ready for execution in order to improve performance. For example, cache storage of the XPath expression:
/Customers/record/field[@id='1234' and @name='bob'] could include compiled and optimized instructions to perform the following set of operations:
1. /Customers: Navigate to root and iterate over all child elements named "Customers" and navigate to each one in turn.
2. /record: Iterate over all child elements named "record" and navigate to each one in turn.
3. /field[@id='1234' and @name='bob']:
    a. Iterate over all child elements named "field".
    b. Test the child "field" element to see if the @id attribute exists and has the value '1234'.
    c. Test the child "field" element to see if the @name attribute exists and has the value 'bob'

These operations can be stored in the XPath expression cache as an in-memory set of objects.

The inventors of the present invention have discovered certain deficiencies in current solutions that utilize an XPath expression cache. For instance, the XPath expression cache currently utilized has a finite amount of storage space. When processing an XML document includes many XPath expression calls, space in the XPath expression cache can become filled very quickly. This can cause the stored mappings of XPath expressions to their compiled forms to be dropped from the XPath expression cache at a rapid rate, before those XPath expressions are even called a second time. In this scenario, a primary purpose of the XPath expression cache is made null because the XPath expression cache fails to prevent the need to re-parse and re-compile XPath expressions identical to earlier XPath expressions. This failure of the XPath expression cache is harmful because it increases the number of cache misses a processing computer experiences. Such cache misses increase processing time, thereby making the computerized processing of the XML-formatted document less efficient.

This problem is further compounded when processing an XML document requires that very similar XPath expressions (e.g., XPath expressions that have a common ancestry but that differ by one or more hardcoded values) be called. The inventors of the present invention have found that when there are minor points of variability among a group of otherwise identical XPath expressions, then the XPath expression cache will be filled with many nearly redundant compiled XPath expressions. For example, if the set of XPath expressions including are evaluated, then the XPath expression cache will contain 5 nearly identical entries:

/Customers/record/field[@id='112340' and @name='abe']
/Customers/record/field[@id='12341' and @name='ben']
/Customers/record/field[@id='12342' and @name='cam']
/Customers/record/field[@id='12343' and @name='dan']
/Customers/record/field[@id='12344' and @name='edd']

The inventors have found that this can lead to the XPath expression cache being quickly exhausted. By the time a particular XPath expression needs to be called again, it likely has already been removed from the XPath expression cache. Further, other XPath expressions that are not even part of the group of very similar XPath expressions are pushed out of the cache faster, causing the cache both to appear redundant and to be practically unusable. Therefore, it becomes necessary continually to reparse and recompile XPath expressions that have been evicted from the XPath expression cache due to lack of space. This result is inefficient and can cause real world performance issues.

Accordingly, the inventors of the present invention have developed a solution to these performance and storage limitations. More specifically, embodiments of the present invention identify and extract points of variability from highly similar XPath expressions, differing only by test values, as they are compiled. This allows fewer compiled XPath expressions to need to be stored in the XPath expression cache, thereby requiring less storage space in the XPath expression cache and allowing compiled XPath expressions to reside longer in the cache. This is accomplished by replacing XPath expressions that have hardcoded values with a general, optimized, and cache-friendly XPath expression, the compiled equivalent of which is stored in the XPath expression cache. Additionally, according to embodiments, this optimized XPath expression can be reported to a user or administrator, allowing them the opportunity to use the general, optimized, and cache-friendly XPath expression in their own programming and data processing.

Embodiments of the present invention improve functionality of a computer system by decreasing a memory load on a cache of the computer system. This is accomplished by condensing a plurality of items that would normally be listed separately in the cache into a single item. This condensing increases available space in the cache and therefore also increases the time that an item is permitted to remain in the cache. This allows embodiments of the present invention to further improve functionality of a computer system by reducing instances of cache misses and, therefore, preventing thrashing, and, more specifically, preventing cache thrashing that degrades a performance of the computer system.

Figure 2:
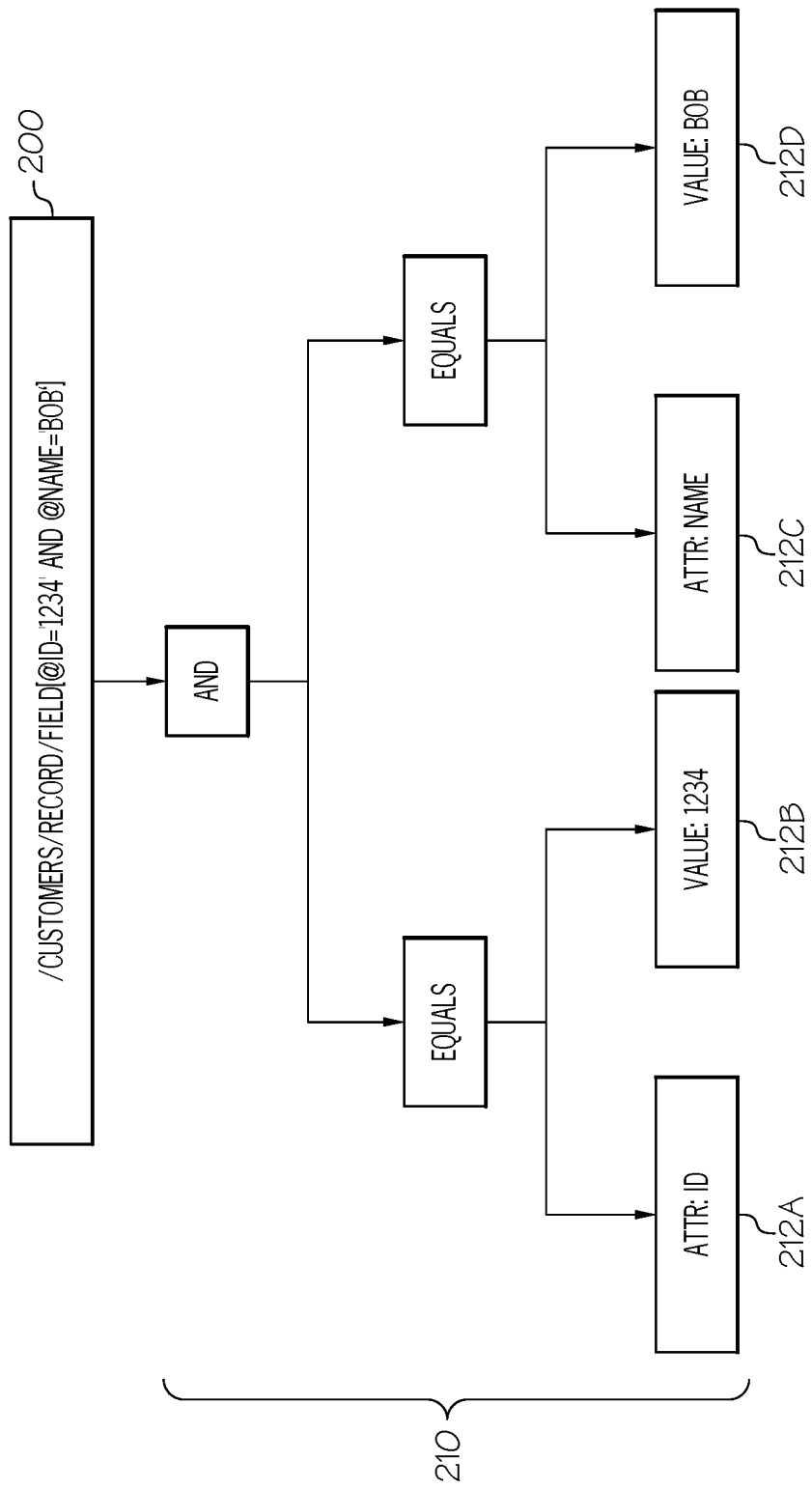
FIG. 2 shows a parsed XPath expression according to illustrative embodiments.

Referring now to FIG. 2, an illustrative example of a parsed XPath expression is shown. When an XPath expression 200 is parsed, the XPath expression is partitioned into a parse tree 210 describing the XPath expression, with the parse tree having nodes 212A-D representing operations available in the XPath language. For example, XPath expression 200 corresponds with parse tree 210, shown in FIG. 2, having node 212A for attribute "id," node 212B for value "1234," node 212C for attribute "name," and node 212D for value "bob." As shown in parse tree 210, some nodes can have hardcoded values (here value "1234" and value "bob") that are part of the expression. As discussed above, when many XPath expressions that are identical but for these values are parsed, compiled, and stored as a mapping from the XPath expression to its compiled equivalent in the XPath expressions cache, the XPath expression cache becomes deluged with highly similar compiled XPath expressions, which push other XPath expressions out of the cache, increasing cache misses. However, by replacing each of these hardcoded XPath expressions, which are identical but for the hardcoded values, with a more generic XPath expression that uses a function to pass the hardcoded values to the generic XPath expression, as will be discussed in detail below, the XPath expression cache need only contain a mapping between the generic XPath expression and its compiled equivalent, thereby freeing storage space in the cache and reducing cache misses.

Figure 3:
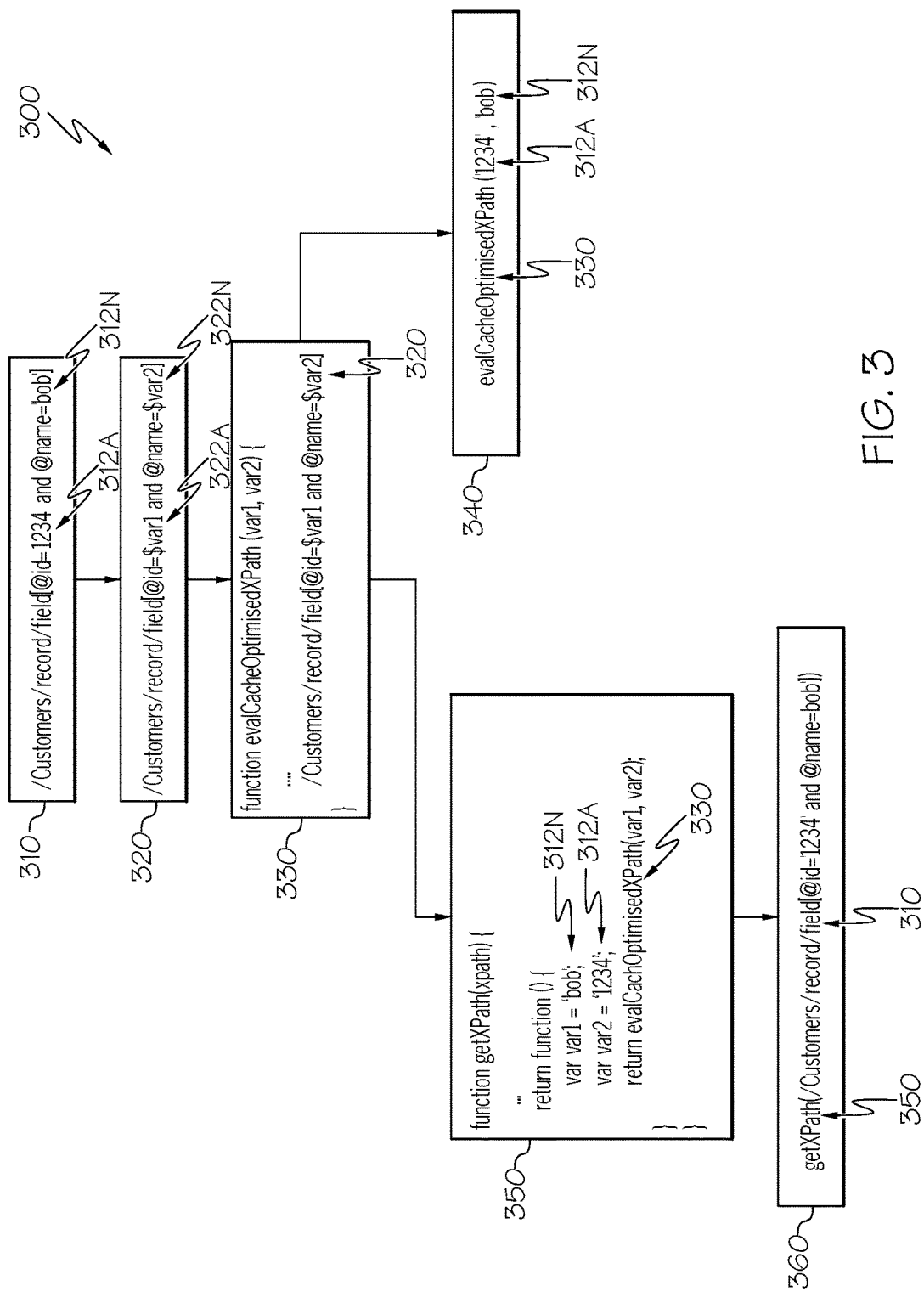
FIG. 3 shows an implementation of the present invention according to illustrative embodiments.

Referring now to FIG. 3, an implementation 300 of an embodiment of the present invention is shown and described. In order to prevent multiple XPath expressions, which have hardcoded values as the only point of difference, from overwhelming an XPath expression cache, these hardcoded XPath expressions can be rewritten using a function whose arguments are the hardcoded values. Such similar XPath expressions can be identified (e.g., by finding a set of XPath expressions with the same ancestry) and then the differing hardcoded values extracted from the XPath expressions as they are parsed or before compiling and replaced with functions containing an XPath expression with variables substituted for the hardcoded values. This allows a more generic XPath expression to be written that uses less space in the cache as compared with the multiple XPath expressions themselves.

According to embodiments of the present invention, this can be accomplished by taking advantage of the XPath language's support of variables with JavaScript identifier (e.g., $variablename) syntax. For example, hardcoded XPath expression 310 with hardcoded attributes or values 312A-N can be rewritten as cache-optimized XPath expression 320 with identifiers/variables 322A-N replacing hardcoded attributes/values 312A-N. Cache-optimized XPath expression 320 can be inserted into the body of cache-optimized XPath function 330 having arguments corresponding to identifiers/variables 322A-N. Accordingly, hardcoded XPath expression 310 with hardcoded values 312A-N can be rewritten as cache-optimized XPath function call 340 for cache-optimized XPath function 330 with the hardcoded attributes/values 312A-N as the arguments of the function call.

In further embodiments of the present invention, it may be desirable to be able to call for the execution of hardcoded XPath expression 310 without needing to isolate hardcoded attribute values 312A-N and/or to supply hardcoded attribute values 312A-N as variables. Because JavaScript permits return of a new function that wraps an existing function, a wrapping function 350 can be created that wraps around cache-optimized XPath function 330. Wrapping function 350 can receive hardcoded XPath expression 310 with hardcoded values 312A-N as its argument. In response to receipt of hardcoded XPath expression 310 with hardcoded values 312A-N, wrapping function 350 can assign hardcoded values 312A-N to identifiers/variables 322A-N and then supply hardcoded values 312A-N as identifiers/variables 322A-N in the arguments of cache-optimized XPath function 330. This assignment of hardcoded values 312A-N from a specific hardcoded XPath expression 310 to identifiers/variables 322A-N can be based on selection logic (e.g., such as a switch or if statement) responsive to the specific hardcoded XPath expression 310.

In some embodiments, wrapping function 350 can be a curried function or partial application function. When wrapping function 350 is a curried function, the curried function can receive hardcoded XPath expression 310 as an argument and break hardcoded XPath expression 310 down to expose hardcoded values 312A-N before passing hardcoded values 312A-N to one or more subordinate cache-optimized XPath functions 330 containing cache-optimized XPath expression 320. When wrapping function 350 is a partial application function, the partial application function can receive hardcoded XPath expression 310 as an argument and identify hardcoded values 312A-N. The partial application function can then bind these hardcoded values 312A-N to the arguments of one or more subordinate cache-optimized XPath functions 330 containing cache-optimized XPath expression 320 by, for example, assigning hardcoded values 312A-N to variables used in the argument of cache-optimized XPath function 330.

These techniques permit a user or other caller to call wrapping function 350 using hardcoded XPath expression 310 as the argument of wrapping function 350, thereby avoiding the need to isolate hardcoded attributes/values 312A-N and/or to supply hardcoded attributes/values 312A-N as variables to a function (e.g. cache-optimized XPath function 330). Instead, the user or other caller may insert hardcoded XPath expression 310 into wrapping function call 360. Therefore, hardcoded XPath expression 310 still appears to the user or caller in the initial uncompiled code, without needing to be analyzed or rewritten, but only cache-optimized XPath expression 320 appears in the XPath expression cache.

Figure 4:
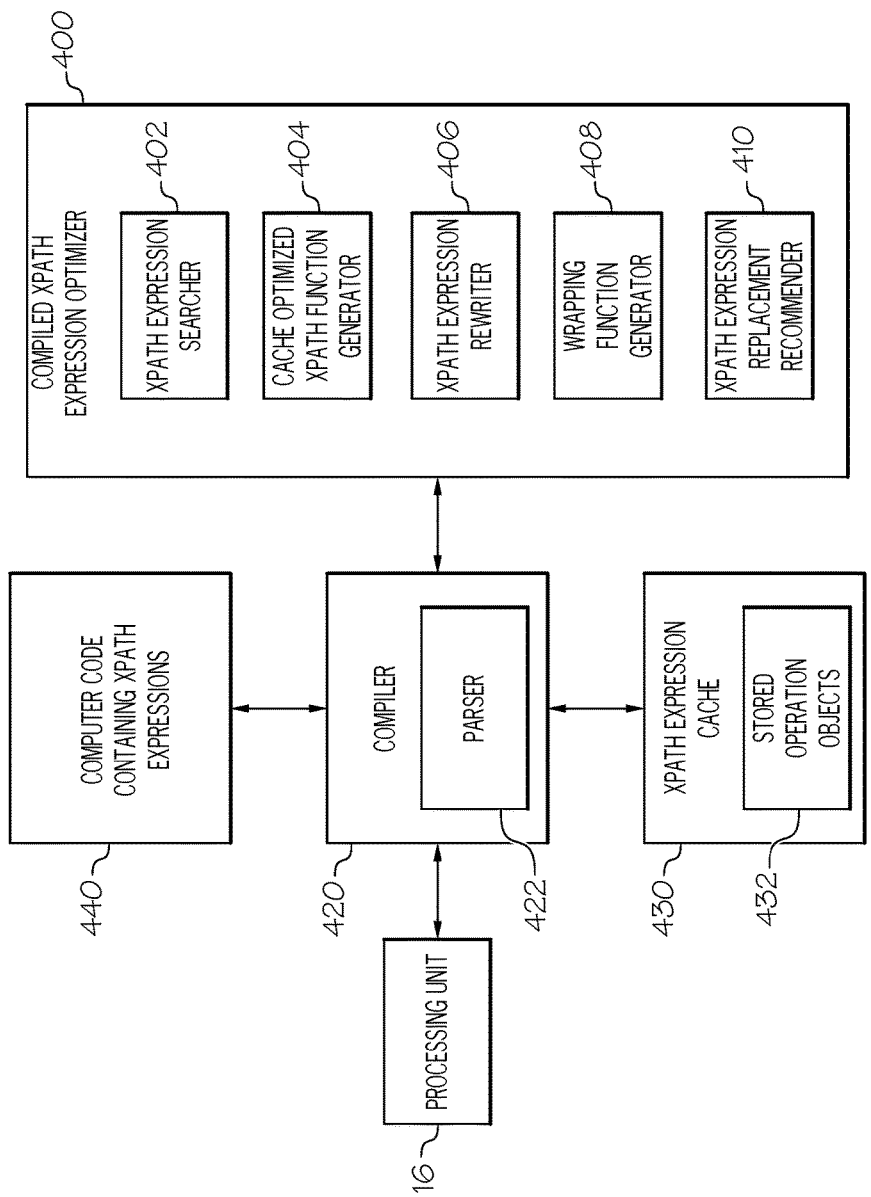
FIG. 4 shows a more detailed system architecture in which the invention may be implemented according to illustrative embodiments.

Referring now to FIG. 4, in addition to FIG. 3, a more detailed system architecture in which the invention may be implemented according to illustrative embodiments is shown. Computer system/server 12 (FIG. 1) can contain compiled XPath expression optimizer 400 having program instructions for carrying out embodiments of the present invention. In some embodiments, compiled XPath expression optimizer 400 can be program/utility 40 of FIG. 1. Compiled XPath expression optimizer 400 can include a set of modules or components for carrying out features of the present invention. More specifically, compiled XPath expression optimizer 400 can include XPath expression searcher 402, cache-optimized XPath function generator 404, XPath expression rewriter 406, wrapping function generator 408, and XPath expression replacement recommender 410.

Compiled XPath expression optimizer 400 can be in communication with compiler 420, which can include parser 422. Compiler 420 can further be in communication with processing unit 16 (FIG. 1) and XPath expression cache 430, which can hold stored operation objects 432. Compiler 420 can further have access to computer code/instructions 440, which can contain XPath expressions.

In some embodiments, optimization of a cache of compiled XPath expressions by removing variability from XPath expressions can be performed by compiled XPath expression optimizer 400. In these embodiments, XPath expression searcher 402 of compiled XPath expression optimizer 400 can review computer code containing XPath expressions 440, parsed by parser 422, to find a plurality of XPath expressions that have the same expression path except for hardcoded node values. According to embodiments of the present invention, XPath expression searcher 402 can further determine if a sufficient number of similar XPath expressions are found to make it practical to optimize the compiled XPath expression cache. For example, this determination may be made in response to the number of similar XPath expressions found reaching a predetermined threshold (i.e., that is the sufficient number). This predetermined threshold could be a set value or a set percent/fraction of computer code containing XPath expressions 440. In still other examples, the sufficient number of XPath expressions can be the point where it takes less computing power to complete the optimization process than to evaluate each of the XPath expressions as they currently stand.

If a sufficient number of similar hardcoded XPath expressions 310 are found, cache-optimized XPath function generator 404 can generate a cache-optimized XPath expression 320. This cache-optimized XPath expression defines the points the XPath expressions have in common (e.g., a node's ancestors) while leaving any points of variability (e.g., the node itself) as identifiers/variables 322A-N. Cache-optimized XPath function generator 404 can write a cache-optimized XPath function 330 whose arguments correspond with the points of variability. When called, cache-optimized XPath function 330 inserts these arguments into cache-optimized XPath expression 320.

Accordingly, when cache-optimized XPath function 330 is compiled, XPath expression 320 is compiled with variables in place of hardcoded values. XPath expression 320 need only be compiled once, and therefore only takes up one place in XPath expression cache 430. Further, by replacing each instance of hardcoded XPath expressions 310 with a call to cache-optimized XPath function 330, as will be discussed in further detail below, each instance of hardcoded XPath expressions 310 need not be compiled or stored in XPath expression cache 430.

It should be understood that, when XPath expressions are automatically optimized for the cache, in order for the cache-optimized XPath expression to be looked up in the cache by subsequent requests to parse similar XPath expressions corresponding to that cache-optimized XPath expression, it is necessary to parse, using parser 422, at least some such similar XPath expression sufficiently to identify the hardcoded values that differ in the similar XPath expressions. Once the hardcoded values have been identified, these similar XPath expressions can be replaced with a call to cache-optimized XPath function 330 which passes the hardcoded values to cache-optimized XPath expression 320 which has variables standing in for the hardcoded values. Therefore, cache-optimized XPath expression 320 can be used as the lookup key in XPath expression cache for a mapping to the compiled equivalent of XPath expression 320. In other words, the introduction of cache-optimized XPath expression 320 to XPath expression cache 430 permits a corresponding optimized artifact to be placed in XPath expression cache 430, thereby optimizing a corresponding syntax tree and offering partially evaluated sub-expressions.

Moreover, while according to some embodiments of the present invention it may be necessary for parser 422 to at least partially parse hardcoded XPath expressions 310, there is no need for compiler 420 to compile these expressions. Therefore, any increase in processing time to calculate the optimized lookup key (i.e., XPath expression 320) is offset by processing time saved by not having to complete processing steps post-parse. Furthermore, because the XPath expressions need not be compiled, XPath expression cache 430 does not experience cache thrashing, as it would when only the hardcoded values of an XPath expression differ from an XPath expression already in the cache.

In any case, once cache-optimized XPath function generator 404 writes cache-optimized XPath function 330, XPath expression rewriter 406 can then rewrite each hardcoded XPath expression 310. More specifically XPath expression rewriter 406 can rewrite each hardcoded XPath expression 310 as cache-optimized XPath function call 340 to cache-optimized XPath function 330 by inserting the hardcoded points of variability (i.e., hardcoded attributes/values 312A-N) as the arguments of function call 340. This rewriting hardcoded XPath expression 310 can be part of a de-bugging or feedback process during development and/or load testing. In some embodiments, this rewriting can be an automatic process. In other embodiments, the rewriting can be an interactive process where XPath expression replacement recommender 410 provides rewrite/replacement suggestions to a user writing XPath expressions, who may replace/rewrite the XPath expression as he or she chooses.

According to some embodiments of the present invention, it may not be desirable for a user or automated system to rewrite each hardcoded XPath expression 310 as cache-optimized XPath function call 340 to cache-optimized XPath function 330 with hardcoded values 312A-N rewritten as the arguments of function call 340. Therefore, in some embodiments, wrapping function generator 408 can generate a wrapping function 350 that wraps around cache-optimized XPath function 330 and that receives the existing hardcoded XPath expression 310 as its argument. XPath expression rewriter 406 can then edit each hardcoded XPath expression 310 by placing wrapping function call 360 around hardcoded XPath expression 310. This insertion of wrapping function call 360 around hardcoded XPath expression 310 can be part of a de-bugging or feedback process during development and/or load testing. In some embodiments, this wrapping function call insertion can be an automatic process. In other embodiments, the insertion can be an interactive process where XPath expression replacement recommender 410 provides rewrite/replacement suggestions to a user writing XPath expressions, who may select to edit the text around the XPath expression as he or she desires.

In some embodiments, XPath expression replacement recommender 410 can provide a user or administrator with a report or record of cache-optimized XPath function 330, wrapping function 350, cache-optimized XPath function call 340 and/or wrapping function call 360. This allows a user or administrator to identify opportunities and implement changes in programs during the writing, feedback, or development process, using cache-optimized XPath function 320. Further, recording information about cache-optimized XPath function 320 allows the user or administrator to retrieve this information at a later date and make use of it in further programming. The information about the cache-optimized XPath function can include: XPath expression requests 310, rewritten and cache-optimized XPath expression 320, functions 330 and/or 340, a number of times XPath expression requests 310 was requested and rewritten, and a number of cache misses that were avoided by rewriting XPath expression requests 310.

In still further embodiments, a user can supply optimized XPath expression 320 and implement replacement of hardcoded XPath expression 310 with cache-optimized XPath function call 340 as he or she writes and reviews computer code. This embodiment can be an extension of profile guided optimization, where a program is executed and feedback from real world execution allows the user or compiler to further optimize the code.

Figure 5:
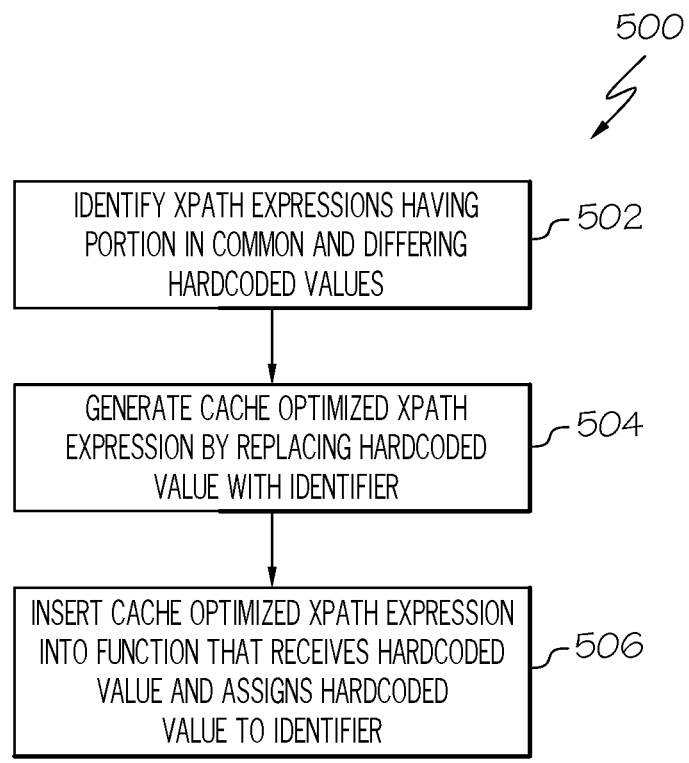
FIG. 5 shows a process flowchart for optimizing a cache of compiled XPath expressions by removing variability from XPath expressions according to illustrative embodiments.

As depicted in FIG. 5, in one embodiment, a system (e.g., computer system 12) carries out the methodologies disclosed herein. Shown is a process flowchart 500 for optimizing a cache of compiled XML Path Language (XPath) expressions. At 502, XPath expression searcher 402 identifies a plurality of XPath expressions, wherein at least a portion of each XPath expression is the same among the plurality and at least one hardcoded value differs between a first XPath expression and a second XPath expression of the plurality. At 504, XPath expression rewriter 406 generates a cache optimized XPath expression from the first XPath expression by replacing the differing at least one hardcoded value with a variable identifier. At 506, cache optimized XPath function generator 404 inserts the cache optimized XPath expression into a cache optimized XPath function configured to receive a hardcoded value as an argument of the function and to assign the received hardcoded value to the variable identifier in the cache optimized XPath expression.

Process flowchart 500 of FIG. 5 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a cache of compiled XPath expressions by removing variability from XPath expressions. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing a cache of compiled XPath expressions by removing variability from XPath expressions. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to optimizing a cache of compiled XPath expressions by removing variability from XPath expressions. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a cache of compiled XML Path Language (XPath) expressions, the method comprising:
   identifying a plurality of XPath expressions, wherein at least a portion of each XPath expression is the same among the plurality and at least one hardcoded value differs between a first XPath expression of the plurality and a second XPath expression of the plurality;
   generating a cache optimized XPath expression from the first XPath expression by replacing the differing at least one hardcoded value with a variable identifier; and
   inserting the cache optimized XPath expression into a cache optimized XPath function as a definition of the cache optimized XPath function, wherein the cache optimized XPath expression is configured to receive a hardcoded value as an argument of the cache optimized XPath function and to pass the received hardcoded value argument to the variable identifier in the cache optimized XPath expression in the definition of the cache optimized XPath function.

2. The method of claim 1, the method further comprising replacing the first XPath expression with a call to the cache optimized XPath function, wherein the call comprises the at least one hardcoded value of the first XPath expression as an argument of the call.

3. The method of claim 2, the method further comprising:
providing a user with a recommendation to replace a XPath expression of the plurality of XPath expressions with a call to the cache optimized XPath function; and
performing the replacing of the first XPath expression in response to approval of the recommendation by the user.

4. The method of claim 1, the method further comprising:
wrapping a call to the cache optimized XPath function with a wrapping function, the wrapping function configured to pass the at least one hardcoded value of the first XPath expression to the cache optimized XPath function in response to receiving the first XPath expression as an argument; and
replacing the first XPath expression with a call to the wrapping function, wherein the call comprises the first XPath expression as an argument of the call.

5. The method of claim 4, the wrapping function further configured to select from a plurality of hardcoded value to pass to the cache optimized XPath function based on an XPath expression of the plurality of XPath expressions received by the wrapping function.

6. The method of claim 4, the method further comprising:
providing a user with a recommendation to replace a XPath expression of the plurality of XPath expressions with a call to the wrapping function; and
performing the replacing of the first XPath expression in response to approval of the recommendation by the user.

7. The method of claim 1, the identifying the plurality of XPath expressions further comprising parsing at least a subset of the plurality of XPath expressions without compiling the plurality of XPath expressions.

8. The method of claim 1, the method being performed process being carried out as a review during a code development process.

9. A computer system for optimizing a cache of compiled XML Path Language (XPath) expressions, the computer system comprising:
a memory medium comprising program instructions;
a bus coupled to the memory medium; and
a processor, for executing the program instructions, coupled to a compiled XPath expression optimizer tool via the bus that when executing the program instructions causes the system to:
identify a plurality of XPath expressions, wherein at least a portion of each XPath expression is the same among the plurality and at least one hardcoded value differs between a first XPath expression of the plurality and a second XPath expression of the plurality;
generate a cache optimized XPath expression from the first XPath expression by replacing the differing at least one hardcoded value with a variable identifier; and
insert the cache optimized XPath expression into a cache optimized XPath function as a definition of the cache optimized XPath function, wherein the cache optimized XPath expression is configured to receive a hardcoded value as an argument of the cache optimized XPath function and to pass the received hardcoded value argument to the variable identifier in the cache optimized XPath expression in the definition of the cache optimized XPath function.

10. The computer system of claim 9, the instructions further causing the system to replace the first XPath expression with a call to the cache optimized XPath function, wherein the call comprises the at least one hardcoded value of the first XPath expression as an argument of the call.

11. The computer system of claim 10, the instructions further causing the system to:
provide a user with a recommendation to replace a XPath expression of the plurality of XPath expressions with a call to the cache optimized XPath function; and
perform the replacing of the first XPath expression in response to approval of the recommendation by the user.

12. The computer system of claim 9, the instructions further causing the system to:
wrap a call to the cache optimized XPath function with a wrapping function, the wrapping function configured to pass the at least one hardcoded value of the first XPath expression to the cache optimized XPath function in response to receiving the first XPath expression as an argument; and
replace the first XPath expression with a call to the wrapping function, wherein the call comprises the first XPath expression as an argument of the call.

13. The computer system of claim 12, wherein the wrapping function is further configured to select from a plurality of hardcoded value to pass to the cache optimized XPath function based on an XPath expression of the plurality of XPath expressions received by the wrapping function.

14. The computer system of claim 12, the instructions further causing the system to:
provide a user with a recommendation to replace a XPath expression of the plurality of XPath expressions with a call to the wrapping function; and
perform the replacing of the first XPath expression in response to approval of the recommendation by the user.

15. The computer system of claim 9, the instructions further causing the system to parse at least a subset of the plurality of XPath expressions without compiling the plurality of XPath expressions.

16. A computer program product for optimizing a cache of compiled XML Path Language (XPath) expressions, the computer program product comprising a computer readable storage device, and program instructions stored on the computer readable storage device, to:
identify a plurality of XPath expressions, wherein at least a portion of each XPath expression is the same among the plurality and at least one hardcoded value differs between a first XPath expression of the plurality and a second XPath expression of the plurality;
generate a cache optimized XPath expression from the first XPath expression by replacing the differing at least one hardcoded value with a variable identifier; and
insert the cache optimized XPath expression into a cache optimized XPath function as a definition of the cache optimized XPath function, wherein the cache optimized XPath expression is configured to receive a hardcoded value as an argument of the cache optimized XPath function and to pass the received hardcoded value argument to the variable identifier in the cache optimized XPath expression in the definition of the cache optimized XPath function.

17. The computer program product of claim 16, the computer readable storage device further comprising instructions to replace the first XPath expression with a call to the cache optimized XPath function, wherein the call comprises the at least one hardcoded value of the first XPath expression as an argument of the call.

18. The computer program product of claim 17, the computer readable storage device further comprising instructions to:
   provide a user with a recommendation to replace a XPath expression of the plurality of XPath expressions with a call to the cache optimized XPath function; and
   perform the replacing of the first XPath expression in response to approval of the recommendation by the user.

19. The computer program product of claim 16, the computer readable storage device further comprising instructions to:
   wrap a call to the cache optimized XPath function with a wrapping function, the wrapping function configured to pass the at least one hardcoded value of the first XPath expression to the cache optimized XPath function in response to receiving the first XPath expression as an argument; and
   replace the first XPath expression with a call to the wrapping function, wherein the call comprises the first XPath expression as an argument of the call.

20. The computer program product of claim 19, wherein the wrapping function is further configured to select from a plurality of hardcoded value to pass to the cache optimized XPath function based on an XPath expression of the plurality of XPath expressions received by the wrapping function.

21. The computer program product of claim 16, the computer readable storage device further comprising instructions to parse at least a subset of the plurality of XPath expressions without compiling the plurality of XPath expressions.

* * * * *